US012769247B2

(12) United States Patent
Noda et al.

(10) Patent No.: US 12,769,247 B2
(45) Date of Patent: Oct. 20, 2026

(54) DEVELOPING CARTRIDGE

(71) Applicant: BROTHER KOGYO KABUSHIKI KAISHA, Nagoya (JP)

(72) Inventors: Ryuji Noda, Nagoya (JP); Junya Sumida, Ama (JP); Ryosuke Hayashi, Nagoya (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 14 days.

(21) Appl. No.: 19/018,689

(22) Filed: Jan. 13, 2025

(65) Prior Publication Data

US 2026/0010114 A1 Jan. 8, 2026

(30) Foreign Application Priority Data

Jul. 2, 2024 (JP) ................................ 2024-106738

(51) Int. Cl.

*G03G 15/08* (2006.01)
*G03G 21/16* (2006.01)
*G03G 21/18* (2006.01)

(52) U.S. Cl.

CPC ..... *G03G 21/1647* (2013.01); *G03G 15/0863* (2013.01); *G03G 21/1652* (2013.01); *G03G 21/1814* (2013.01); *G03G 21/1821* (2013.01); *G03G 21/1871* (2013.01); *G03G 2221/1823* (2013.01); *G03G 2221/1853* (2013.01)

(58) Field of Classification Search

CPC ........... G03G 15/0863; G03G 21/1647; G03G 21/1652; G03G 21/1814; G03G 21/1821; G03G 21/1871; G03G 21/1885; G03G 2221/1823; G03G 2221/1853

See application file for complete search history.

(56) References Cited

U.S. PATENT DOCUMENTS

| | | | | |
|---|---|---|---|---|
| 10,025,264 | B1 | 7/2018 | Itabashi | |
| 2017/0184998 | A1 | 6/2017 | Itabashi | |
| 2018/0095415 | A1 | 4/2018 | Nishiyama et al. | |
| 2018/0373195 | A1 | 12/2018 | Itabashi | |
| 2021/0311410 | A1 | 10/2021 | Kusuda et al. | |
| 2021/0318639 | A1 | 10/2021 | Itabashi | |
| 2022/0082991 | A1* | 3/2022 | Tosuji ................ | G03G 21/1647 |

(Continued)

FOREIGN PATENT DOCUMENTS

| | | | |
|---|---|---|---|
| JP | 2017-116826 | A | 6/2017 |
| JP | 2018-169521 | A | 11/2018 |

(Continued)

*Primary Examiner* — Sophia S Chen
(74) *Attorney, Agent, or Firm* — Merchant & Gould P.C.

(57) ABSTRACT

The developing cartridge includes a housing, a developing roller, a memory, a holder, and a cover, the developing roller rotates about a developing axis extending in a first direction, and the holder holds the electrical contact surface. The housing has a first boss extending in the first direction toward the cover, and a screw for attaching the cover to the housing is fastened to the first boss. The holder has a hole extending in the first direction, and the first boss is inserted into the hole. Thus, the first boss has a function of receiving a screw for attaching the cover to the housing and a function of holding the holder. This can reduce the number of parts of the developing cartridge.

17 Claims, 13 Drawing Sheets

(56) References Cited

U.S. PATENT DOCUMENTS

| | | | | | |
|---|---|---|---|---|---|
| 2023/0205132 | A1* | 6/2023 | Noda | ................. | G03G 15/0863 399/111 |
| 2023/0244183 | A1* | 8/2023 | Mori | .................. | G03G 21/1871 399/12 |

FOREIGN PATENT DOCUMENTS

| | | | |
|---|---|---|---|
| JP | 2019-8101 | A | 1/2019 |
| JP | 2021-162749 | A | 10/2021 |

* cited by examiner

DEVELOPING CARTRIDGE

REFERENCE TO RELATED APPLICATIONS

This application claims priority from Japanese Patent Application No. 2024-106738 filed on Jul. 2, 2024. The entire content of the priority application is incorporated herein by reference.

BACKGROUND ART

Conventionally, an electrophotographic image forming apparatus such as a laser printer or an LED printer is known. A conventional image forming apparatus is described in, for example, Japanese Patent Application Publication No. 2021-162749. The image forming apparatus includes a developing cartridge and a drum cartridge. The developing cartridge is mounted to the drum cartridge. The drum cartridge with the developing cartridge mounted thereto is attached to a main body frame of the image forming apparatus.

The developing cartridge includes a memory. The memory is held by a holder movable relative to a housing of the developing cartridge. When the drum cartridge with the developing cartridge mounted thereto is attached to the image forming apparatus, the electrical contact surface of the memory held by the holder comes into contact with an electrode of the image forming apparatus. This enables the control unit of the image forming apparatus to communicate with the memory.

SUMMARY

However, in the above-described image forming apparatus, the cover for holding the holder is attached by a screw. The holder is held with respect to the cover by a boss protruding from the holder. That is, a structure for attaching the cover and a structure for holding the holder with respect to the cover are separately provided. Therefore, the number of parts of the developing cartridge is increased.

In view of the above, the present disclosure provides a developing cartridge including a holder for holding a memory, which has a structure capable of reducing the number of components.

According to a first aspect, the developing cartridge includes a housing configured to accommodate toner, a developing roller configured to rotate about a developing axis extending in a first direction, a memory including an electrical contact surface positioned at one end of the housing in the first direction, a holder configured to hold the electrical contact surface and movable relative to the housing, and a cover attached to the one end of the housing in the first direction.

According to a second aspect of the present disclosure, the developing cartridge according to the first aspect further includes a gear positioned at one end portion of the housing in the first direction, and the cover covers the gear.

In a third aspect, the holder may include a first holder having a first end portion that holds the electrical contact surface, a second holder having a second end portion that is separated from the first end portion in a second direction intersecting the first direction, and a spring that is positioned between the first end portion and the second end portion and is extendable and contractible in the second direction.

According to a fourth aspect of the present disclosure, in the developing cartridge according to the third aspect, the holder is movable in the second direction with respect to the housing in a state where the first boss is inserted into the hole.

In a fifth aspect, the holder may include a second boss extending in the first direction toward the housing, the housing may include a recess recessed in the first direction, and the holder may be movable relative to the housing in a direction intersecting the first direction in a state where the second boss is inserted into the recess.

A sixth aspect is the developing cartridge according to the third aspect, wherein the second direction is a direction intersecting the electrical contact surface.

A seventh aspect is the developing cartridge according to the third aspect, wherein the first end portion is farther from the developing roller than the second end portion.

According to an eighth aspect of the present disclosure, in the developing cartridge according to the third aspect, the second end portion of the holder is positioned between the housing and the cover in the first direction.

A ninth aspect is the developing cartridge according to the third aspect, wherein the second end portion is positioned inside the cover in the second direction, and the first end portion is positioned outside the cover in the second direction.

A tenth aspect is the developing cartridge according to the ninth aspect, wherein the first end portion is positioned outside the housing in the second direction.

An eleventh aspect is the developing cartridge according to the ninth aspect, wherein the cover has an opening edge facing the holder in a rotational direction about the first boss.

A twelfth aspect is the developing cartridge according to the third aspect, which is mountable to a drum cartridge including a photosensitive drum rotatable about a drum axis extending in the first direction and a drum frame supporting the photosensitive drum, the drum frame including a protrusion extending in a third direction intersecting the first direction and the second direction, the protrusion being in contact with the second end portion in a state where the developing cartridge is mounted to the drum cartridge.

A thirteenth aspect is the developing cartridge according to the twelfth aspect, wherein the holder includes a guide surface inclined with respect to the second direction and the third direction, and the guide surface is configured to contact the protrusion in a process of attaching the developing cartridge to the drum cartridge.

A fourteenth aspect is the developing cartridge according to the thirteenth aspect, wherein the first holder includes a first guide surface that is the guide surface and is inclined with respect to the second direction and the third direction.

A fifteenth aspect is the developing cartridge according to the thirteenth aspect, wherein the second holder includes a second guide surface that is the guide surface and is inclined with respect to the second direction and the third direction.

A sixteenth aspect is the developing cartridge according to the twelfth aspect, wherein the drum cartridge includes a pressing member that presses the developing cartridge toward the photosensitive drum in a state where the developing cartridge is mounted to the drum cartridge, the housing includes a pressing surface with which the pressing member comes into contact, and the holder and the pressing surface are arranged in a direction intersecting the first direction.

According to the first to sixteenth aspects, the first boss has a role of receiving a screw for attaching the cover to the housing and a role of holding the holder. In this way, the first boss is provided with two functions, so that the number of parts of the developing cartridge can be reduced.

According to the third aspect, the holder can be expanded and contracted in the second direction.

According to the fifth aspect, it is possible to suppress the holder from being inclined with respect to the housing.

According to the ninth aspect, the dimension of the developing cartridge in the second direction can be reduced as compared with the case where the entire holder is positioned outside the cover.

According to the eleventh aspect, the rotation of the holder about the first boss can be restricted.

According to the twelfth aspect, the holder can be positioned in the second direction with respect to the drum frame by the protrusion of the drum frame.

According to the thirteenth aspect, the holder can be guided by the guide surface in the process of mounting the developing cartridge on the drum cartridge.

According to the sixteenth aspect, the dimension of the developing cartridge in the first direction can be reduced compared to a case where the holder and the pressing surface are disposed at different positions in the first direction.

DESCRIPTION

Figure 1:
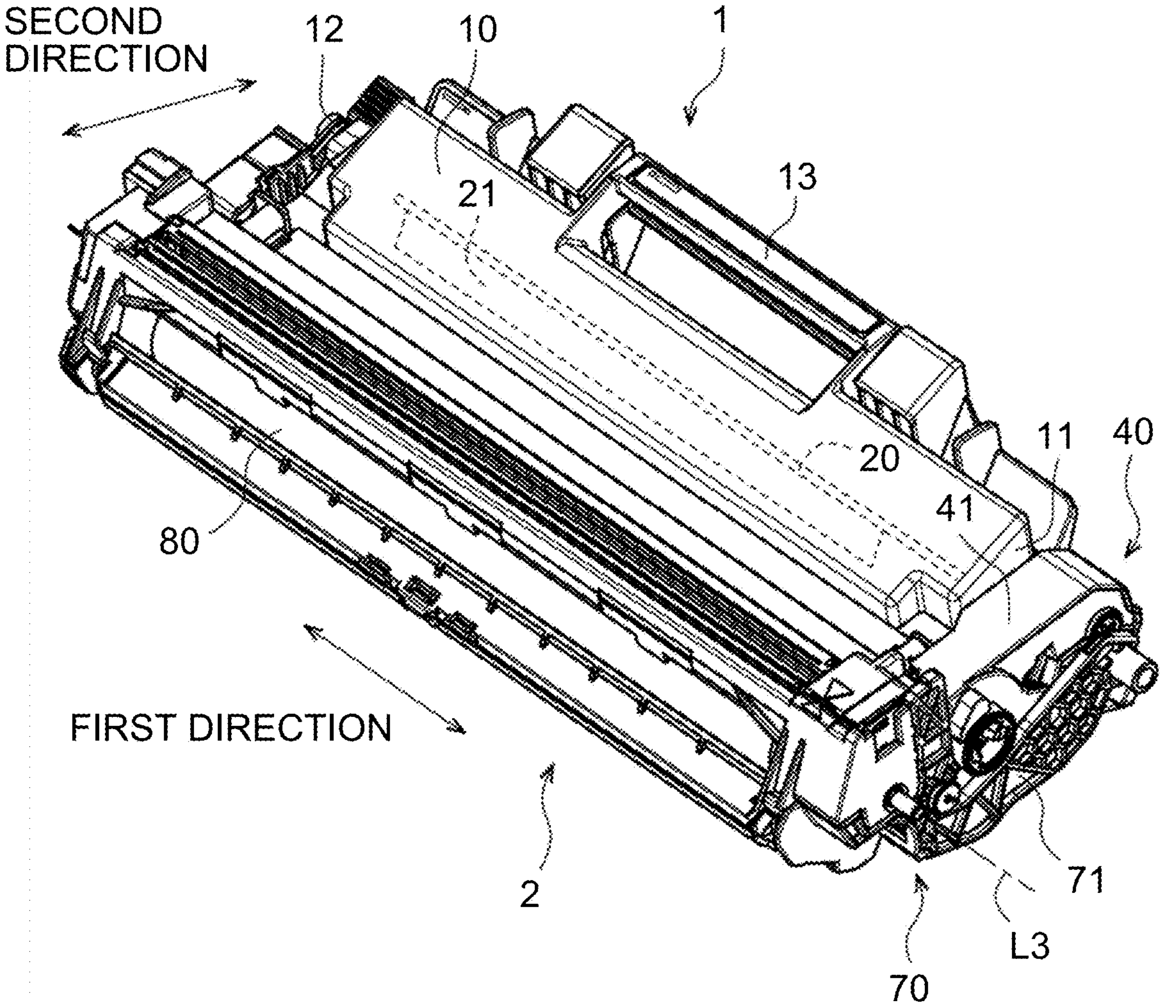
FIG. 1 is a perspective view of a developing cartridge and a drum cartridge.

Hereinafter, embodiments of the present disclosure will be described with reference to the drawings.

Hereinafter, a direction in which the developing axis L2 of the developing cartridge 1 extends is referred to as a “first direction”. A direction in which the first end portion 610 and the second end portion 620 of the holder 60 are arranged is referred to as a “second direction”. The direction in which the protrusion 75 of the drum frame 70 extends is referred to as a “third direction”.

The first direction and the second direction intersect with each other. For example, the first direction and the second direction are orthogonal to each other. The first direction and the third direction intersect with each other. For example, the first direction and the third direction are orthogonal to each other. The second direction and the third direction intersect with each other. For example, the second direction and the third direction are orthogonal to each other.

<1. Overview of Developing Cartridge and Drum Cartridge>

Figure 2:
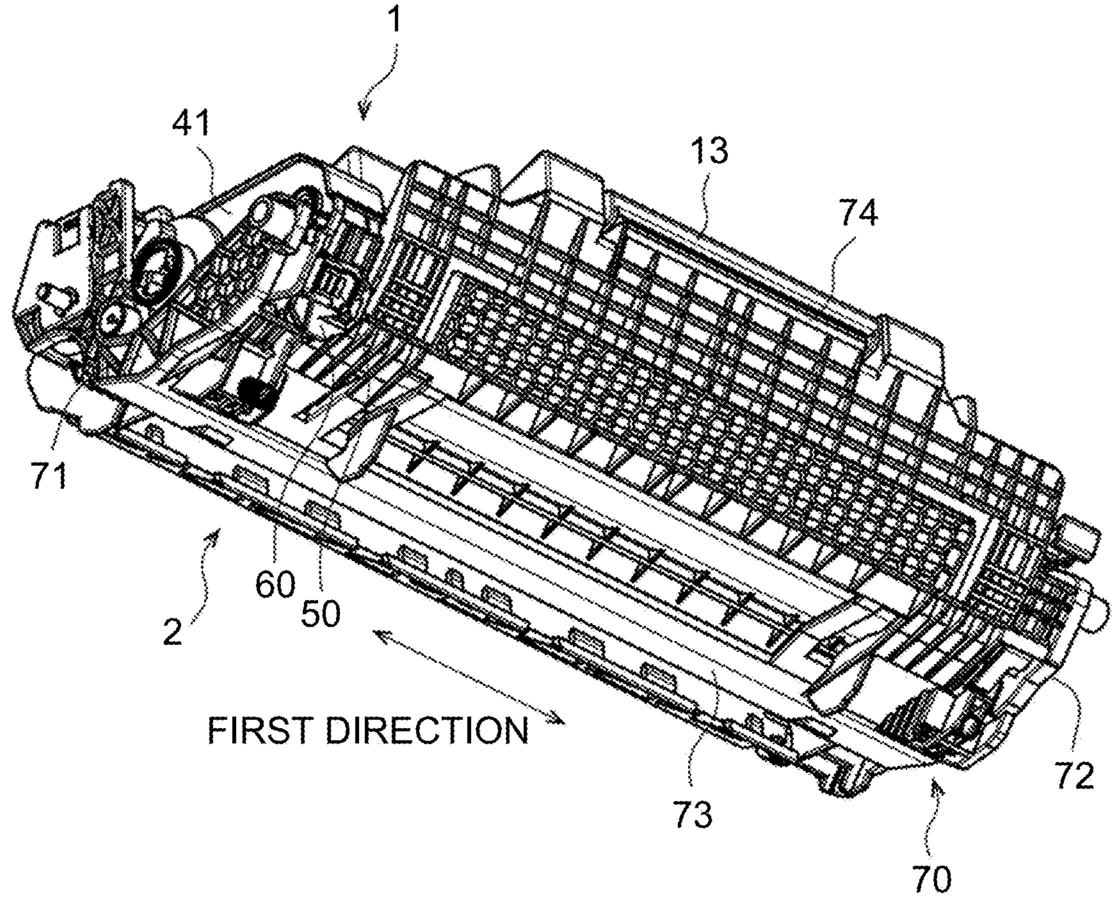
FIG. 2 is a perspective view of a developing cartridge and a drum cartridge.
Figure 3:
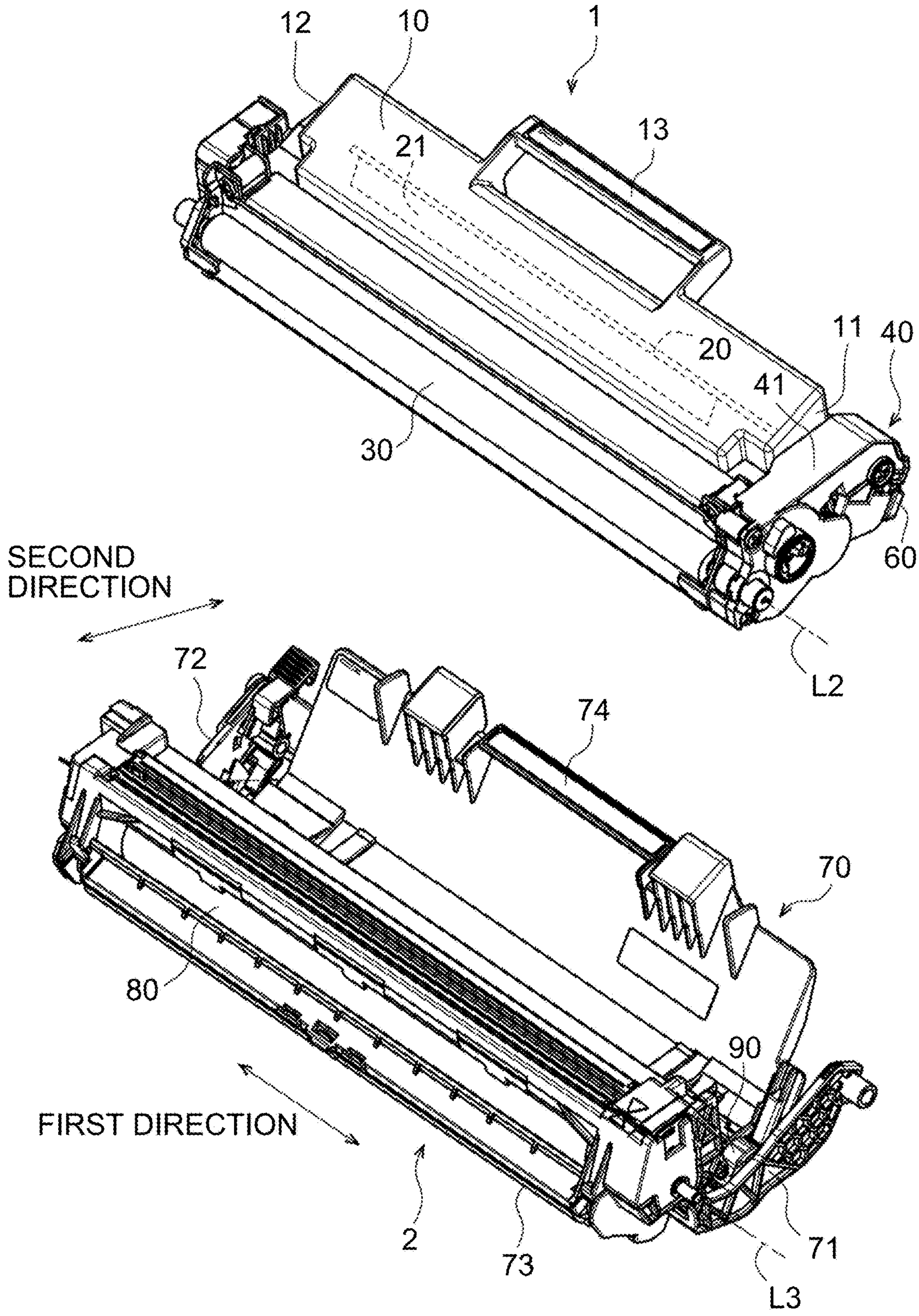
FIG. 3 is a perspective view of a developing cartridge and a drum cartridge.
Figure 4:
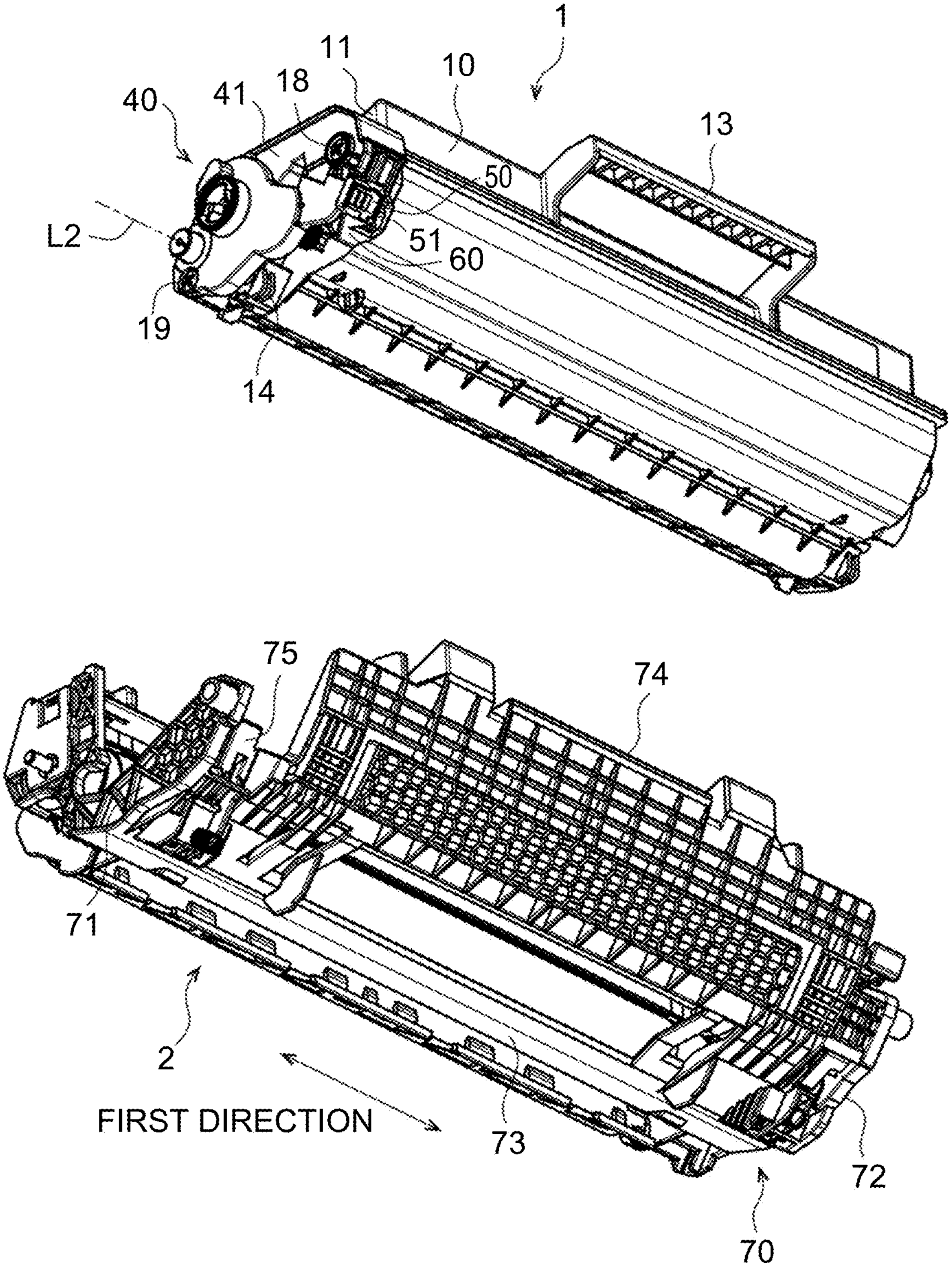
FIG. 4 is a perspective view of a developing cartridge and a drum cartridge.

FIGS. 1 to 4 are perspective views of the developing cartridge 1 and the drum cartridge 2. FIG. 1 shows a state in which the developing cartridge 1 is mounted to the drum cartridge 2. FIG. 2 shows a state in which the developing cartridge 1 is mounted to the drum cartridge 2, from a different angle from FIG. 1. FIG. 3 shows a state in which the developing cartridge 1 is removed from the drum cartridge 2. FIG. 4 shows a state in which the developing cartridge 1 is removed from the drum cartridge 2, from a different angle from FIG. 3.

The developing cartridge 1 and the drum cartridge 2 are used in an electrophotographic image forming apparatus. The image forming apparatus is, for example, a laser printer or an LED printer. The developing cartridge 1 is mountable to the drum cartridge 2. The drum cartridge 2 to which the developing cartridge 1 is attached can be attached to a main body frame of the image forming apparatus. The image forming apparatus forms an image on a printing sheet with toner supplied from the developing cartridge 1.

<2. Developing Cartridge>

As shown in FIGS. 1 to 4, the developing cartridge 1 includes a housing 10, an agitator 20, a developing roller 30, a gear portion 40, a memory 50, and a holder 60.

The housing 10 is a container capable of containing toner as a developer. The housing 10 has a first outer surface 11 and a second outer surface 12. The first outer surface 11 is positioned at one end portion of the housing 10 in the first direction. The second outer surface 12 is positioned at the other end of the housing 10 in the first direction. The first outer surface 11 and the second outer surface 12 are separated from each other in the first direction. The housing 10 includes a handle 13. The handle 13 is positioned at one end of the housing 10 in the second direction.

The agitator 20 is positioned inside the housing 10. The agitator 20 has a blade 21. The agitator 20 is rotatable about an agitator axis L1 (see FIG. 5) extending in the first direction. When the agitator 20 rotates about the agitator axis L1, the toner in the housing 10 is agitated by the blade 21.

The developing roller 30 is rotatable about a developing axis L2 extending in the first direction. The developing roller 30 is supported by the housing 10. The developing roller 30 is positioned at the other end portion of the housing 10 in the second direction. The toner in the housing 10 is supplied to the outer circumferential surface of the developing roller 30 via a supply roller (not shown). Thus, the toner is carried on the outer peripheral surface of the developing roller 30.

The gear portion 40 is positioned on the first outer surface 11 of the housing 10. The gear portion 40 includes a plurality of gears and a cover 41. The cover 41 is attached to the first outer surface 11 of the housing 10. More specifically, the cover 41 is fixed to the first outer surface 11 of the housing 10 by the first screw 18 and the second screw 19. A method of fixing the cover 41 to the housing 10 will be described later.

The plurality of gears are positioned between the first outer surface 11 and the cover 41 in the first direction. That is, the plurality of gears are covered by the cover 41. In a state where the drum cartridge 2 to which the developing cartridge 1 is attached is attached to the main body frame, the image forming apparatus supplies a driving force to the agitator 20 and the developing roller 30 via the plurality of gears of the gear portion 40. As a result, the agitator 20 and the developing roller 30 rotate.

Figure 5:
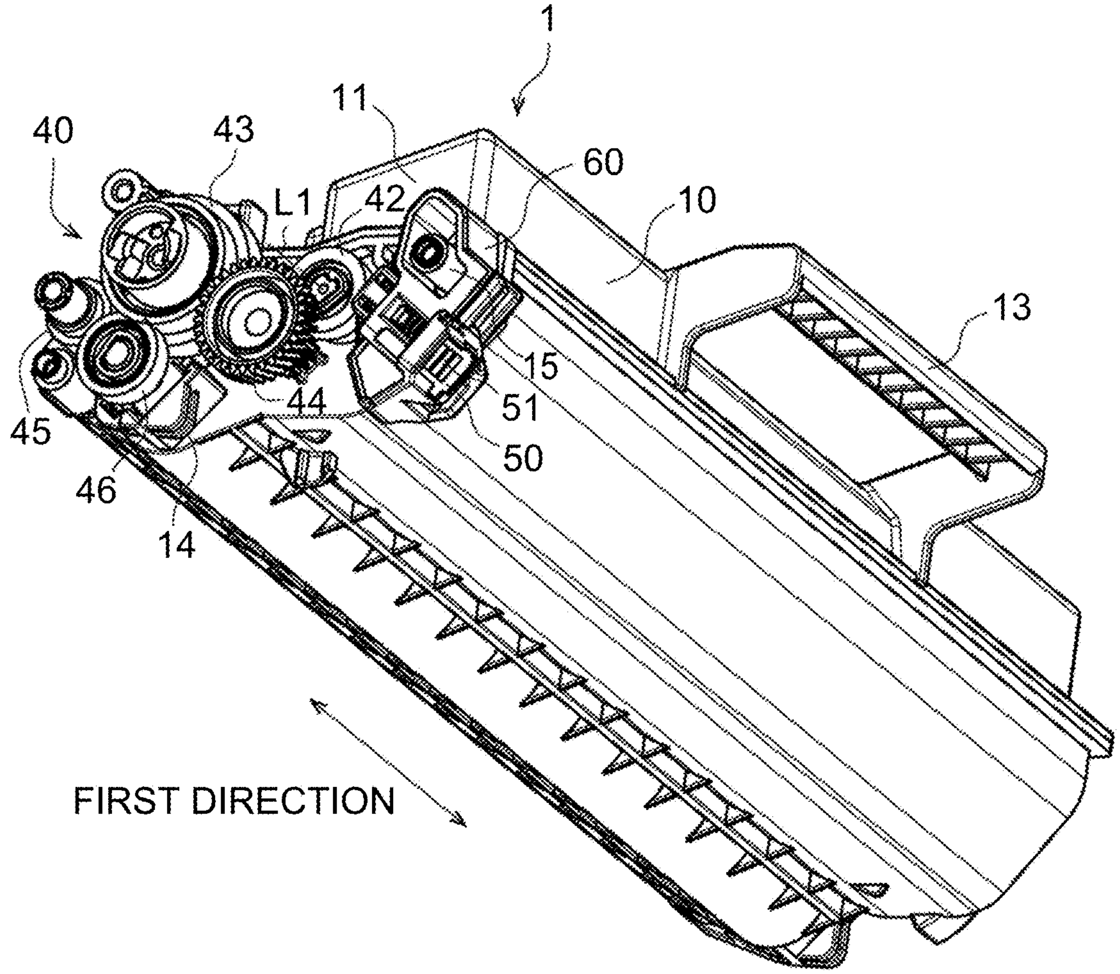
FIG. 5 is a perspective view of the developing cartridge in a state in which a cover is removed.
Figure 6:
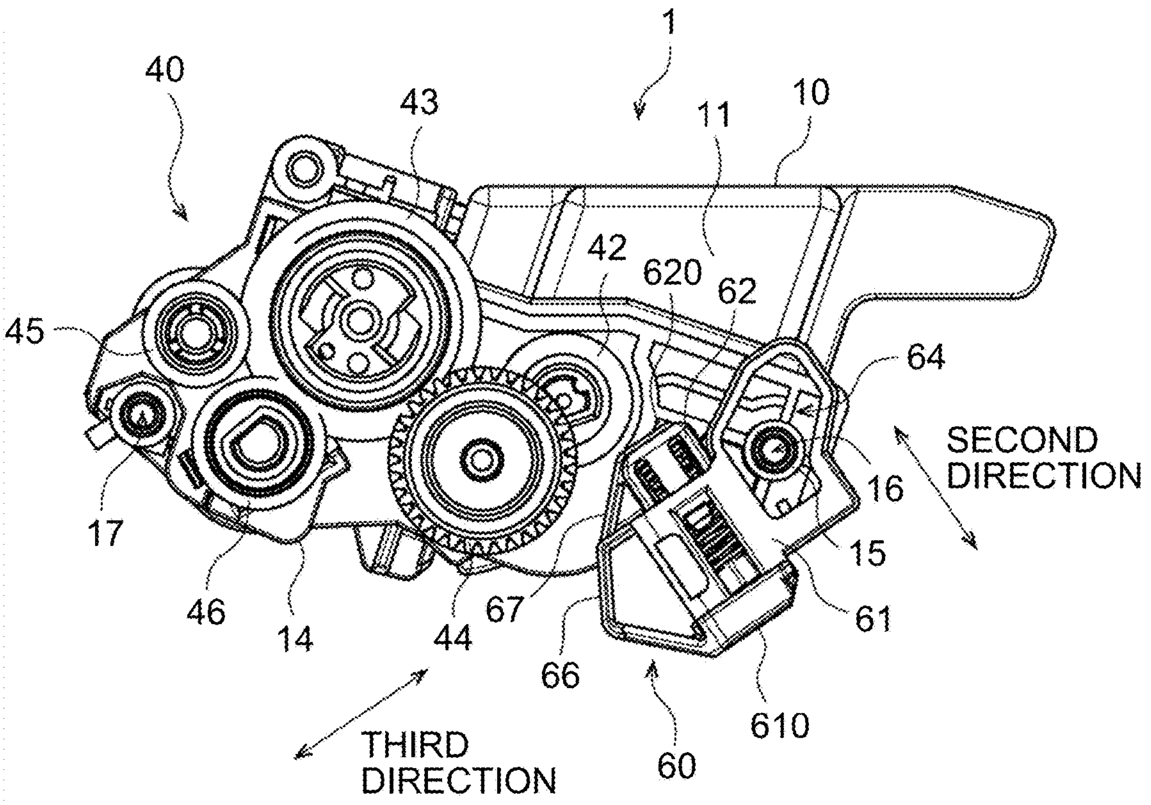
FIG. 6 is a view of the developing cartridge in a state where a cover is removed, as viewed in a first direction.

FIG. 5 is a perspective view of the developing cartridge 1 in a state where the cover 41 is removed. FIG. 6 is a view of the developing cartridge 1 in a state where the cover 41 is removed, as viewed in the first direction. As shown in FIGS. 5 and 6, the plurality of gears of the gear portion 40 include an agitator gear 42, a coupling gear 43, an idle gear 44, a developing roller gear 45, and a supply roller gear 46.

The agitator gear 42 is attached to one end portion of the agitator 20 in the first direction. When the agitator gear 42 rotates, the agitator 20 also rotates about the agitator axis L1 together with the agitator gear 42.

The developing roller gear 45 is attached to one end portion of the developing roller 30 in the first direction. When the developing roller gear 45 rotates, the developing roller 30 also rotates about the developing axis L2 extending in the first direction together with the developing roller gear 45.

The supply roller gear 46 is attached to one end portion of the supply roller in the first direction. When the supply roller gear 46 rotates, the supply roller also rotates about the rotation axis extending in the first direction together with the supply roller gear 46.

The coupling gear 43 meshes with the idle gear 44, the developing roller gear 45, and the supply roller gear 46. The idle gear 44 meshes with the agitator gear 42. When the coupling gear 43 receives a driving force from the image forming apparatus, the developing roller gear 45, the supply roller gear 46, and the idle gear 44 rotate. When the idle gear 44 rotates, the agitator gear 42 also rotates.

The memory 50 is a storage medium in which information relating to the developing cartridge 1 is stored. The memory 50 is positioned on the first outer surface 11 of the housing 10. The memory 50 is, for example, an IC chip. The memory 50 stores at least one of identification information and life information of the developing cartridge 1. The identification information is information for identifying the developing cartridge 1. The identification information is, for example, a serial number of the developing cartridge 1. The life information is information indicating the life of the developing cartridge 1. The life information is, for example, the cumulative number of rotations of the developing roller 30.

As shown in FIGS. 4 and 5, the memory 50 has an electrical contact surface 51. The electrical contact surface 51 is a surface of a metal which is a conductor. The electrical contact surfaces 51 are electrically connected to the storage elements of the memory 50. The electrical contact surface 51 is a surface intersecting the second direction. For example, the electrical contact surface 51 is a surface orthogonal to the second direction. In a state where the developing cartridge 1 is mounted to the drum cartridge 2, the electrical contact surface 51 is exposed from the drum frame 70. When the drum cartridge 2 to which the developing cartridge 1 is attached is attached to the image forming apparatus, the electrical contact surface 51 comes into contact with an electrode of the image forming apparatus. This enables the control unit of the image forming apparatus to communicate with the memory 50.

Figure 7:
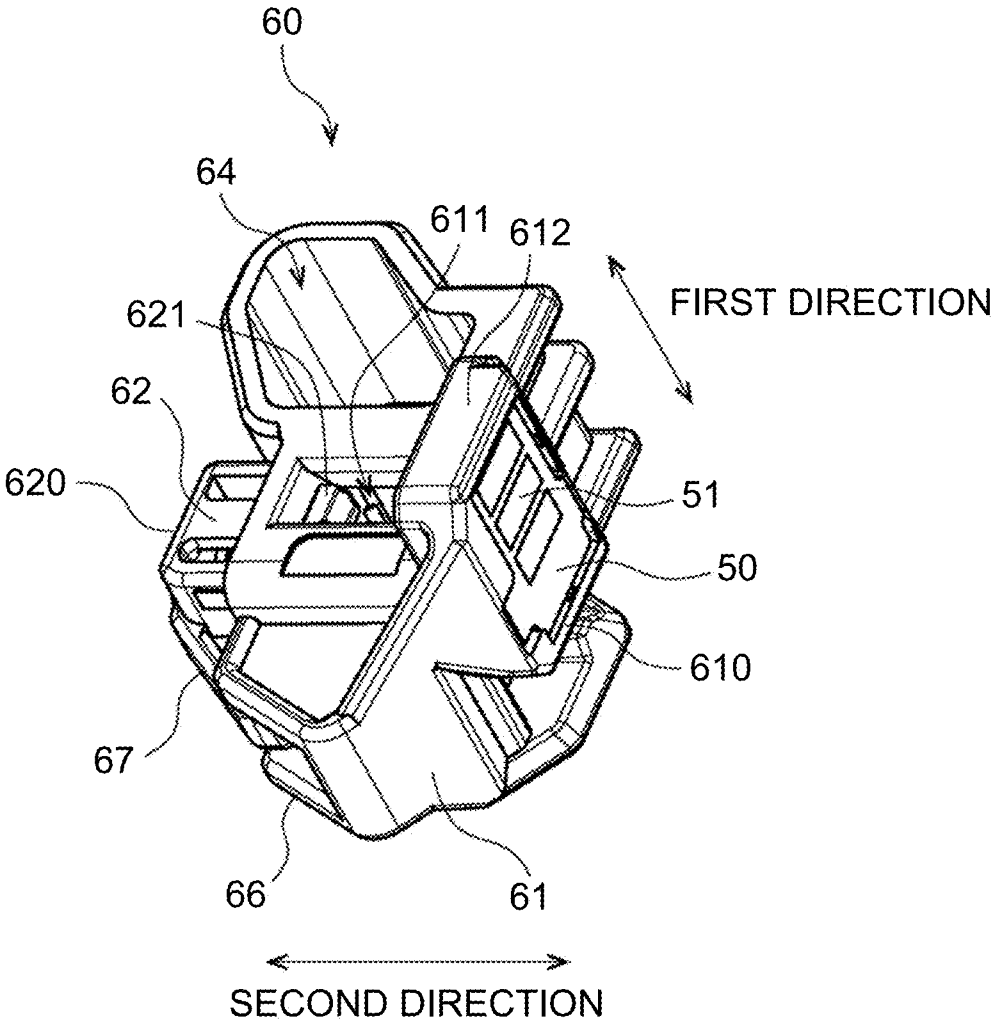
FIG. 7 is a perspective view of a holder.
Figure 8:
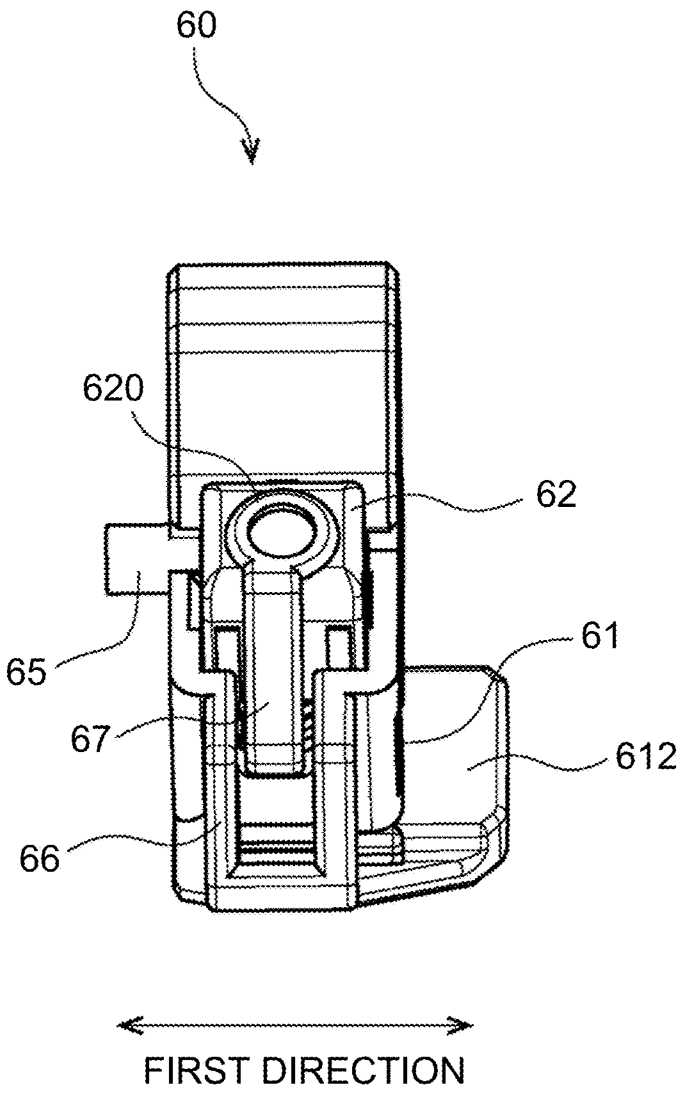
FIG. 8 is a view of the holder as viewed from a direction perpendicular to the first direction.
Figure 9:
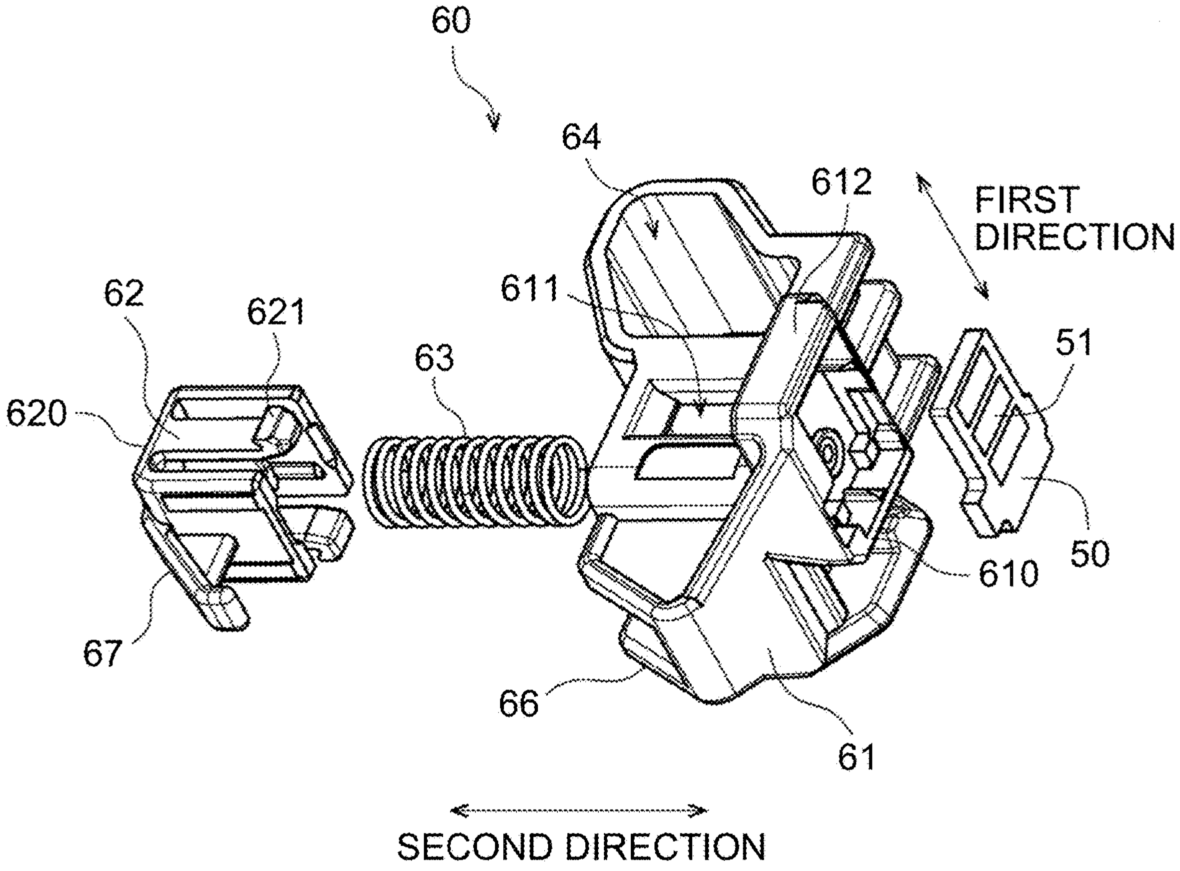
FIG. 9 is an exploded perspective view of the holder.

The holder 60 is a unit that holds the memory 50. The holder 60 is positioned at the first outer surface 11 of the housing 10. FIG. 7 is a perspective view of the holder 60. FIG. 8 is a view of the holder 60 as viewed from a direction orthogonal to the first direction. FIG. 9 is an exploded perspective view of the holder 60. As shown in FIGS. 7 to 9, the holder 60 includes a first holder 61, a second holder 62, and a spring 63.

The first holder 61 has a first end or first end portion 610. The first end portion 610 is one end portion of the holder 60 in the second direction. The second holder 62 has a second end or second end portion 620. The second end portion 620 is the other end portion of the holder 60 in the second direction. The first end portion 610 and the second end portion 620 are separated from each other in the second direction. The first end portion 610 is farther from the developing roller 30 than the second end portion 620.

The first holder 61 is movable in the second direction with respect to the second holder 62. Therefore, the first end portion 610 is movable in the second direction with respect to the second end portion 620. The length of the holder 60 in the second direction changes as the first holder 61 moves in the second direction with respect to the second holder 62. Specifically, the length of the holder 60 in the second direction changes between a first length and a second length that is shorter than the first length.

The first holder 61 of the present embodiment has a cup shape that is open in the second direction toward the second holder 62. The second holder 62 is inserted into the first holder 61. The first holder 61 has a through hole 611. The through hole 611 penetrates a portion of the first holder 61 in the first direction. The second holder 62 has a claw 621. The claw 621 protrudes in the first direction from a portion of the second holder 62. The claw 621 is inserted into the through hole 611. This prevents the second holder 62 from being removed from the first holder 61 in the second direction.

The memory 50 is positioned at the first end 610 of the holder 60. Thus, the electrical contact surface 51 is positioned at the first end 610 of the holder 60. In the present embodiment, the entire memory 50 is held by the first end portion 610 of the holder 60. However, only the electrical contact surface 51 of the memory 50 may be held by the first end portion 610 of the holder 60, and the storage element of the memory 50 may be held by a portion other than the holder 60 of the developing cartridge 1. In this case, the storage element of the memory 50 and the electrical contact surface 51 may be electrically connected by a conductive wire.

The spring 63 is an elastic member that can expand and contract in the second direction. The spring 63 is, for example, a coil spring. One end portion of the spring 63 in the second direction is in contact with the first holder 61. The other end portion of the spring 63 in the second direction is in contact with the second holder 62. The spring 63 is positioned between the first end portion 610 and the second end portion 620 in a state of being compressed in the second direction from the natural length. Therefore, the holder 60 is always urged or biased from the second length toward the first length by the elastic force of the spring 63.

The holder 60 is positioned between the first outer surface 11 of the housing 10 and the cover 41 in the first direction. The holder 60 is attached to the housing 10 and the cover 41. The holder 60 is movable in the second direction and the third direction with respect to the housing 10 and the cover 41. A structure for attaching the holder 60 to the housing 10 and the cover 41 will be described later.

<3. Drum Cartridge>

As shown in FIGS. 1 to 4, the drum cartridge 2 includes a drum frame 70, a photosensitive drum 80, and a pressing member 90.

The drum frame 70 includes a first side frame 71, a second side frame 72, a connection frame 73, and a handle 74. The first side frame 71 is positioned at one end portion of the drum frame 70 in the first direction. The second side frame 72 is positioned at the other end portion of the drum frame 70 in the first direction. The first side frame 71 and the second side frame 72 are separated from each other in the first direction. The connecting frame 73 connects the first side frame 71 and the second side frame 72 in the first direction. The handle 74 is positioned at one end portion of the drum frame 70 in the second direction.

The developing cartridge 1 is mountable to the drum frame 70. In a state where the developing cartridge 1 is mounted to the drum frame 70, the developing cartridge 1 is positioned between the first side frame 71 and the second side frame 72 in the first direction.

The photosensitive drum 80 is a drum rotatable about a drum axis L3 extending in the first direction. The photosensitive drum 80 is supported by the drum frame 70. The photosensitive drum 80 is positioned between the first side frame 71 and the second side frame 72 in the first direction. The photosensitive drum 80 is positioned at the other end portion of the drum frame 70 in the second direction.

The photosensitive drum 80 has a cylindrical outer peripheral surface. The outer circumferential surface of the photosensitive drum 80 is covered with a photosensitive material. In a state where the drum cartridge 2 is mounted to the main body frame of the image forming apparatus, the photosensitive drum 80 receives a driving force from the image forming apparatus. Thus, the photosensitive drum 80 rotates about the drum axis L3.

In a state where the developing cartridge 1 is mounted to the drum frame 70, the developing roller 30 and the photosensitive drum 80 are arranged in the second direction. More specifically, in a state where the developing cartridge 1 is mounted to the drum frame 70, the outer peripheral surface of the developing roller 30 and the outer peripheral surface of the photosensitive drum 80 are in contact with each other.

The toner is supplied from the outer circumferential surface of the developing roller 30 to the outer circumferential surface of the photosensitive drum 80. At this time, the toner moves from the developing roller 30 to the photosensitive drum 80 in accordance with the electrostatic latent image formed on the outer circumferential surface of the photosensitive drum 80. As a result, an image is formed on the outer circumferential surface of the photosensitive drum 80 with the toner. Thereafter, the toner image is transferred from the photosensitive drum 80 to the printing paper.

Figure 10:
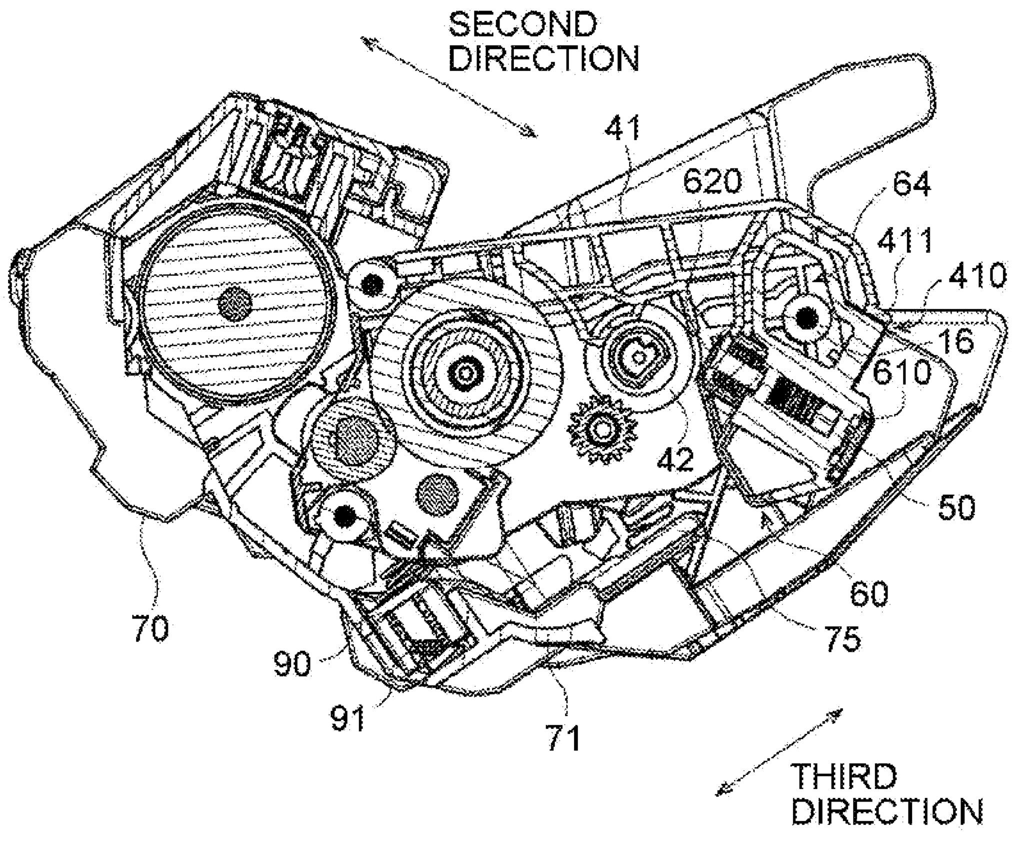
FIG. 10 is a sectional view of the developing cartridge and the drum cartridge in the process of mounting the developing cartridge to the drum cartridge.

The pressing member 90 is a member that presses the developing cartridge 1 toward the photosensitive drum 80 in a state where the developing cartridge 1 is mounted to the drum cartridge 2. As shown in FIG. 3, the pressing member 90 is attached to the first side frame 71. The drum cartridge 2 includes a spring 91 (see FIGS. 10 and 13). The spring 91 is positioned between the pressing member 90 and the first side frame 71.

On the other hand, as shown in FIGS. 4 to 6, the housing 10 of the developing cartridge 1 has a pressing surface 14. When the developing cartridge 1 is mounted to the drum cartridge 2, the pressing member 90 contacts the pressing surface 14. The pressing member 90 presses the pressing surface 14 toward the photosensitive drum 80 by the elastic force of the spring 91. As a result, the developing roller 30 and the photosensitive drum 80 are brought into contact with each other.

<4. Holder>

Next, the holder 60 of the developing cartridge 1 will be described in more detail.

As shown in FIGS. 7 and 9, the holder 60 has a hole 64. More specifically, the first holder 61 has a hole 64 extending in the first direction. The hole 64 penetrates the first holder 61 in the first direction and may extend entirely through the first holder 61. On the other hand, as shown in FIGS. 5 and 6, the housing 10 has a first boss 15. The first boss 15 extends outward from the outer surface of the housing 10 in the first direction. More specifically, the first boss 15 extends in the first direction from the first outer surface 11 of the housing 10 toward the cover 41. The first boss 15 has, for example, a columnar shape. However, the first boss 15 may have another shape such as a prismatic shape. The first boss 15 is inserted into the hole 64 of the holder 60.

The size of the hole 64 in the second direction is larger than the size of the first boss 15 in the second direction. Therefore, the holder 60 is movable in the second direction with respect to the first boss 15 in a state where the first boss 15 is inserted into the hole 64. Thus, the holder 60 is movable in the second direction with respect to the housing 10 and the cover 41. When the holder 60 moves in the second direction with respect to the housing 10 and the cover 41, the electrical contact surface 51 of the memory 50 also moves in the second direction with respect to the housing 10 and the cover 41 together with the holder 60.

The size of the hole 64 in the third direction is larger than the size of the first boss 15 in the third direction. Therefore, the holder 60 is movable in the third direction with respect to the first boss 15 in a state where the first boss 15 is inserted into the hole 64. Thus, the holder 60 is movable in the third direction with respect to the housing 10 and the cover 41. When the holder 60 moves in the third direction with respect to the housing 10 and the cover 41, the electrical contact surface 51 of the memory 50 also moves in the third direction with respect to the housing 10 and the cover 41 together with the holder 60.

The first boss 15 has a first screw hole 16. The first screw hole 16 is a hole to which a first screw 18 is fastened to attach the cover 41 to the housing 10. The first screw hole 16 extends in the first direction from the distal end of the first boss 15 in the first direction along the central axis of the first boss 15. The first screw 18 extends through a hole formed in the cover 41 and is threadably received in the first screw hole 16. A portion of the cover 41 is sandwiched between the head of the first screw 18 and the first boss 15. Thus, the cover 41 is attached to the housing 10.

The cover 41 is fixed to the housing 10 not only by the first screw 18 but also by the second screw 19. The housing 10 has a second screw hole 17 at a position different from the first screw hole 16 of the first outer surface 11. The second screw 19 is fastened to the second screw hole 17 through a hole formed in the cover 41. In this way, the cover 41 is fixed to the housing 10 by the two screws 18, 19, and thus the cover 41 can be more firmly fixed to the housing 10.

The first boss 15 has two functions, i.e., a function of receiving the first screw 18 for attaching the cover 41 to the housing 10 and a function of holding the holder 60. In this way, by providing the first boss 15 with two functions, the number of parts of the developing cartridge 1 can be reduced compared to a case where the two functions are realized by separate parts.

The first boss 15 into which the first screw 18 is inserted has high strength.

Therefore, the first boss 15 into which the first screw 18 is inserted is less likely to be deformed. The hole 64 of the holder 60 into which the first boss 15 is inserted is not a recess but a through hole. That is, the first boss 15 having high strength penetrates the hole 64 of the holder 60. This can prevent the holder 60 from inclining in the first direction with respect to the housing 10 and the cover 41.

As shown in FIG. 8, the holder 60 includes a second boss 65. The second boss 65 extends in the first direction from the outer surface of the holder 60 toward the housing 10. More specifically, the second boss 65 extends in the first direction from the outer surface of the first holder 61 toward the housing 10. On the other hand, the housing 10 has a recess (not shown). The recess is recessed in the first direction from the first outer surface 11 of the housing 10. The second boss 65 is inserted into the recess.

In this way, the second boss 65 is inserted into the recess, and thus the holder 60 is further prevented from being inclined in the first direction with respect to the housing 10 and the cover 41. The size of the recessed portion in the second direction is larger than the size of the second boss 65 in the second direction. Therefore, even in a state where the second boss 65 is inserted into the recess, the second boss 65 does not prevent the holder 60 from moving in the second direction with respect to the housing 10 and the cover 41. The size of the recessed portion in the third direction is larger than the size of the second boss 65 in the third direction. Therefore, even in a state where the second boss 65 is inserted into the recess, the second boss 65 does not prevent the holder 60 from moving in the third direction with respect to the housing 10 and the cover 41.

FIGS. 10 to 13 are sectional views of the developing cartridge 1 and the drum cartridge 2 in the process of mounting the developing cartridge 1 to the drum cartridge 2. FIGS. 10 to 13 show a cross section passing through the holder 60 and perpendicular to the first direction.

The holder 60 is partially covered by the cover 41. Specifically, of the first end portion 610 and the second end portion 620 of the holder 60, the second end portion 620 is covered by the cover 41, and the first end portion 610 is positioned outside the cover 41. The second end portion 620 is positioned between the first outer surface 11 of the housing 10 and the cover 41 in the first direction. The second end portion 620 is positioned inside the cover 41 in the second direction. The first end portion 610 is positioned outside the cover 41 in the second direction. The first end portion 610 is positioned outside the housing 10 in the second direction. The second end portion 620 is positioned between the plurality of gears of the gear portion 40 and the first end portion 610 in the second direction.

In this way, in the present embodiment, a portion of the holder 60 is positioned inside the cover 41 in the second direction. Therefore, the dimension of the developing cartridge 1 in the second direction can be reduced as compared with a case where the entire holder 60 is positioned outside the cover 41.

As shown in FIGS. 10 to 13, the cover 41 has an opening 410. The opening 410 is a hole that penetrates a part of the cover 41 in the second direction. The holder 60 is disposed in the opening 410. The cover 41 has an annular opening edge 411 that is an edge of the opening 410. The opening edge 411 faces the holder 60 in the rotational direction about the first boss 15. Therefore, when the holder 60 rotates about the first boss 15, the holder 60 abuts against the opening edge 411. Thus, the rotation of the holder 60 about the first boss 15 is restricted.

As shown in FIGS. 7 to 9, the holder 60 has a protruding wall 612. Specifically, the first holder 61 has a protruding wall 612. The protruding wall 612 protrudes from the first end portion 610 of the holder 60 in a direction away from the housing 10 in the first direction. The protruding wall 612 is positioned outside the cover 41 in the second direction. The protruding wall 612 faces the opening edge 411 of the cover 41 in the second direction. The protruding wall 612 is contactable with the opening edge 411 of the cover 41 in the second direction. This prevents the first end portion 610 of the holder 60 from entering the inside of the cover 41.

The plurality of gears of the gear portion 40 and the holder 60 at least partially overlap each other in the first direction. The second end portion 620 of the holder 60 is arranged with a part of the gears of the gear portion 40 in the second direction. In the present embodiment, the agitator gear 42 and the holder 60 are disposed at the same position in the first direction. The second end portion 620 of the holder 60 is arranged with the agitator gear 42 in the second direction. More specifically, the second end portion 620 of the holder 60 and the end surface of the tooth of the agitator gear 42 face each other in the second direction. With this configuration, the dimension of the developing cartridge 1 in the first direction can be reduced as compared with a case where the agitator gear 42 and the holder 60 are disposed at different positions in the first direction.

As shown in FIGS. 10 to 13, the drum frame 70 includes a protrusion 75. The protrusion 75 extends from the first side frame 71 in the third direction. The protrusion 75 protrudes in a direction away from the pressing member 90 in the third direction. When the developing cartridge 1 is mounted to the drum cartridge 2, the protrusion 75 is inserted into the cover 41. That is, the protrusion 75 is inserted between the first outer surface 11 of the housing 10 and the cover 41. At this time, the protrusion 75 is inserted between the holder 60 and the agitator gear 42 in the second direction. Thus, the protrusion 75 restricts the position of the holder 60 in the second direction.

Figure 12:
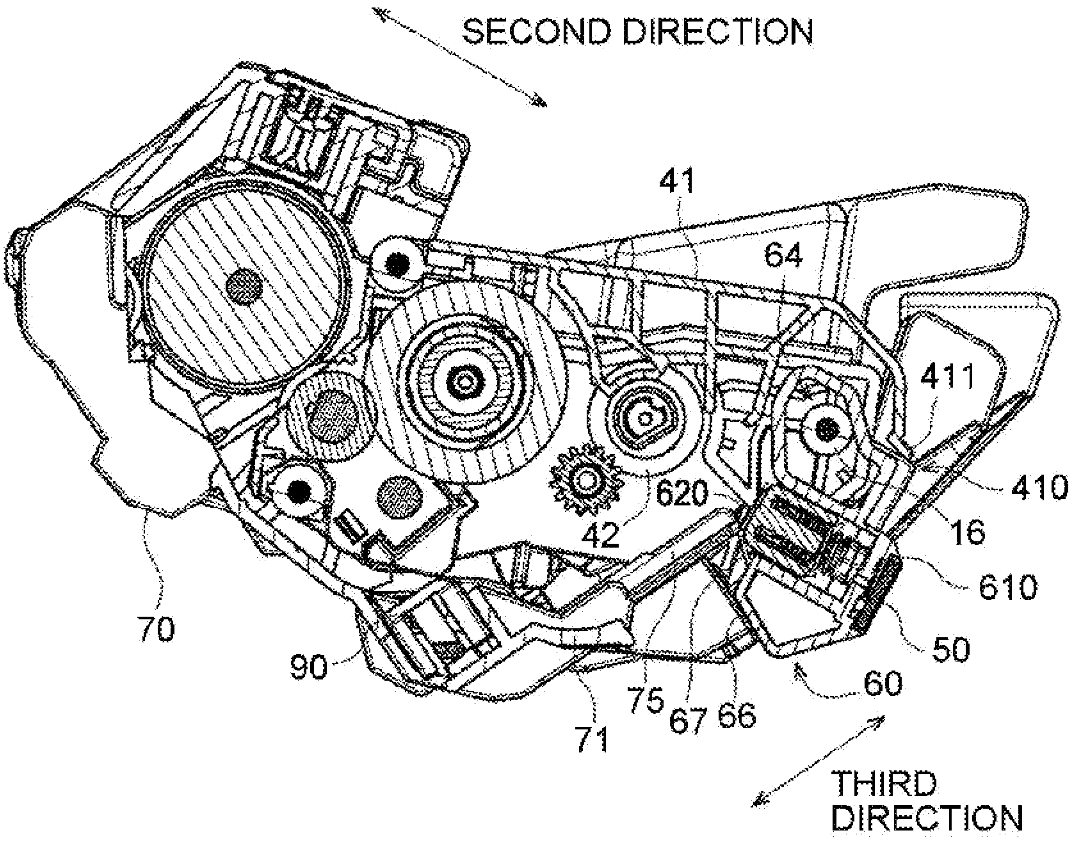
FIG. 12 is a sectional view of the developing cartridge and the drum cartridge in the process of mounting the developing cartridge to the drum cartridge.
Figure 13:
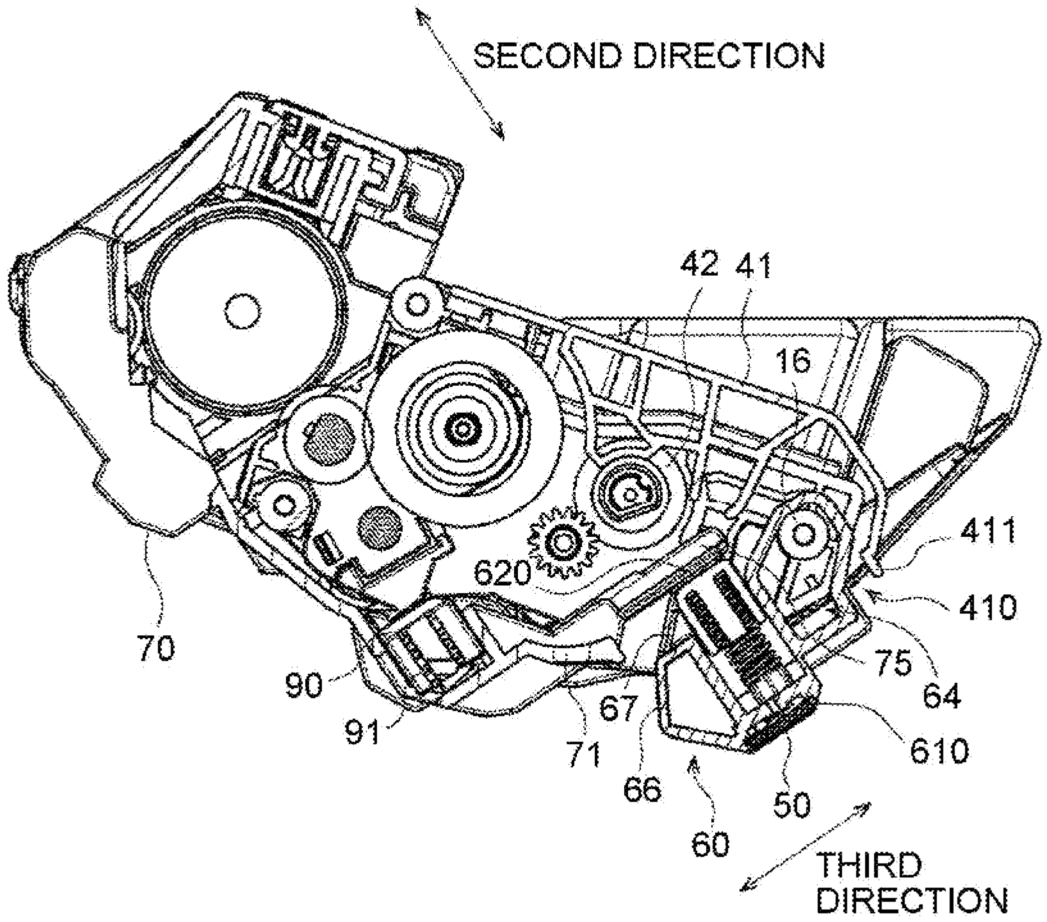
FIG. 13 is a sectional view of the developing cartridge and the drum cartridge in the process of mounting the developing cartridge to the drum cartridge.

As shown in FIG. 12, in the present embodiment, in the process of mounting the developing cartridge 1 to the drum cartridge 2, the protrusion 75 contacts the second end portion 620 of the holder 60. Thus, the holder 60 moves in the second direction with respect to the housing 10. When the attachment of the developing cartridge 1 to the drum cartridge 2 is completed, the protrusion 75 contacts the second end portion 620 of the holder 60 as shown in FIG. 13. Thus, the holder 60 is positioned in the second direction with respect to the drum frame 70 and the housing 10.

In a state where the developing cartridge 1 is mounted to the drum cartridge 2, the protrusion 75 is positioned between the holder 60 and the agitator gear 42 in the second direction. The protrusion 75 is positioned between the first outer surface 11 and the cover 41 in the first direction.

As shown in FIG. 13, the electrical contact surface 51 is movable in the second direction in a state where the protrusion 75 is in contact with the second end portion 620 of the holder 60. More specifically, when the spring 63 expands and contracts in the second direction, the electrical contact surface 51 moves in the second direction with respect to the protrusion 75.

When no external force is applied to the holder 60, the spring 63 has the first length. When an external force is applied to the holder 60 in a direction from the first end portion 610 toward the second end portion 620, the second end portion 620 is supported by the protrusion 75, the first end portion 610 moves in a direction approaching the second end portion 620, and the spring 63 is compressed. This allows the electrical contact surface 51 to move relative to the protrusion 75.

As shown in FIGS. 7 to 9, the holder 60 has a first guide surface 66 and a second guide surface 67. Specifically, the first holder 61 has a first guide surface 66, and the second holder 62 has a second guide surface 67. The first guide surface 66 and the second guide surface 67 are guide surfaces for guiding the holder 60 with respect to the drum frame 70 in the process of mounting the developing cartridge 1 to the drum cartridge 2.

The first guide surface 66 and the second guide surface 67 are inclined with respect to the second direction and the third direction. More specifically, the first guide surface 66 and the second guide surface 67 are surfaces that extend so as to approach the second end portion 620 in the third direction as the distance from the first end portion 610 in the second direction increases.

Figure 11:
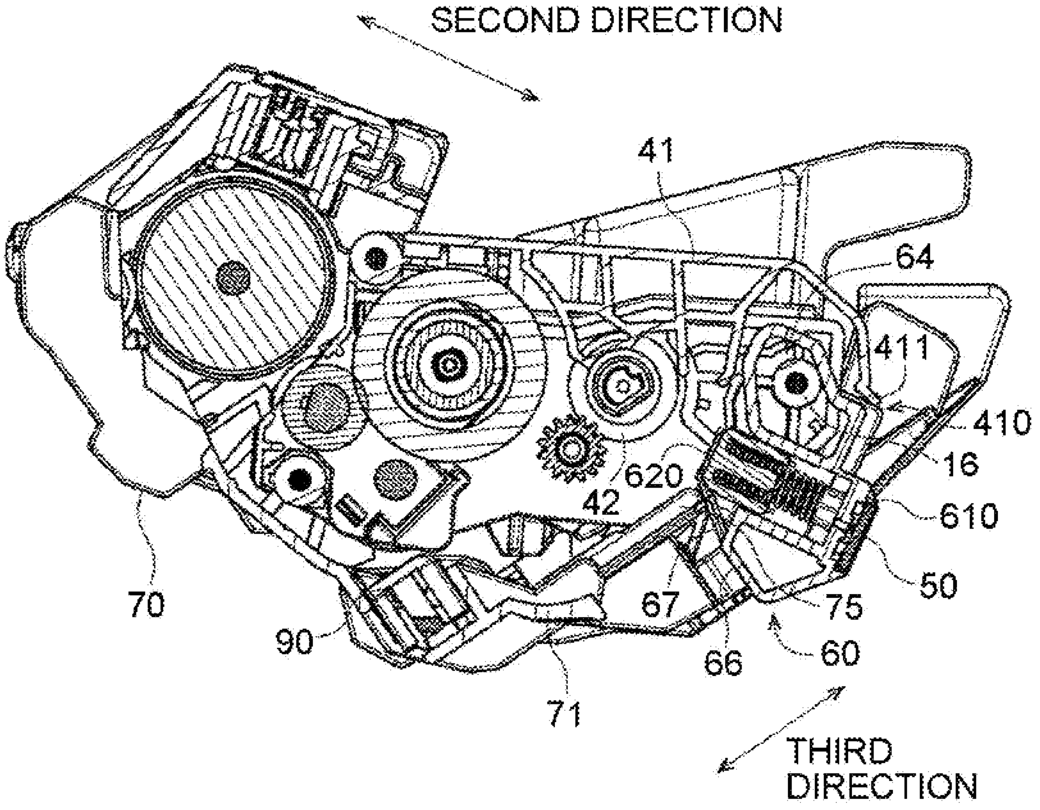
FIG. 11 is a sectional view of the developing cartridge and the drum cartridge in the process of mounting the developing cartridge to the drum cartridge.

In the process of mounting the developing cartridge 1 to the drum cartridge 2, the first guide surface 66 first comes into contact with the protrusion 75. Then, the first guide surface 66 moves along the protrusion 75. Thereafter, as shown in FIG. 11, the second guide surface 67 comes into contact with the protrusion 75. Then, the second guide surface 67 moves along the protrusion 75. Thus, the holder 60 moves to a space on the opposite side of the agitator gear 42 with respect to the protrusion 75 in the second direction. As a result, the protrusion 75 can be inserted between the second end portion 620 of the holder 60 and the agitator gear 42.

The pressing surface 14 and the holder 60 at least partially overlap each other in the first direction. As shown in FIG. 6, the holder 60 and the pressing surface 14 are arranged in a direction intersecting the first direction. Therefore, the dimension of the developing cartridge 1 in the first direction can be reduced as compared with a case where the pressing surface 14 and the holder 60 are disposed at different positions in the first direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the cover 41 is an integral component. For example, the cover 41 may include two components, that is, a first cover that covers the plurality of gears and a second cover that covers the second end portion of the holder 60.

In the above-described embodiment, the holder 60 includes the first holder 61, the second holder 62, and the spring 63. For example, the holder 60 may not include the spring 63.

Alternatively, the first end portion 610 holding the electrical contact surface 51 and the second end portion 620 aligned with the gear may be formed as a single component.

Alternatively, the holder 60 may not include the second holder 62, and the spring 63 may directly contact the protrusion 75.

In the above-described embodiment, the spring 63 is a coil spring. For example, the spring 63 may be a plate spring or the like.

In the above-described embodiment, the first holder 61 of the holder 60 has the hole 64. For example, the second holder 62 may have a hole, and the holder 60 may be movable with respect to the housing 10 in a state where the first boss 15 of the housing is inserted into the hole of the second holder 62.

In the above-described embodiment, the ribs constituting the holes 64 of the holder 60 are continuous. For example, a part of the rib constituting the hole 64 may be cut as long as the rib is held by the first boss 15.

Further, the elements described in the above embodiments and modifications may be combined as appropriate within a range in which no contradiction occurs.

What is claimed is:

1. A developing cartridge comprising:

a housing configured to accommodate toner therein;

a developing roller rotatable about a developing axis extending in a first direction;

a memory having an electrical contact surface positioned at one end of the housing in the first direction;

a holder holding the electrical contact surface, the holder being movable relative to the housing; and a cover attached to the one end of the housing in the first direction, wherein the housing includes a first boss extending in the first direction toward the cover, the first boss having a screw fastened thereto to attach the cover to the housing, wherein the holder includes a hole extending in the first direction, and wherein the holder is movable relative to the housing in a direction intersecting the first direction in a state where the first boss is inserted into the hole.

2. The developing cartridge according to claim 1, further comprising a gear positioned at one end of the housing in the first direction, wherein the cover covers the gear.

3. The developing cartridge according to claim 1, wherein the holder includes:

a first end that holds the electrical contact surface;

a second end that is separated from the first end in a second direction intersecting the first direction; and a spring that is positioned between the first end and the second end and is compressible in the second direction.

4. The developing cartridge according to claim 3, wherein the holder is movable in the second direction relative to the housing in a state where the first boss is inserted into the hole.

5. The developing cartridge according to claim 3, wherein the second direction is a direction intersecting the electrical contact surface.

6. The developing cartridge according to claim 3, wherein the first end is farther from the developing roller than the second end.

7. The developing cartridge according to claim 3, wherein the second end of the holder is positioned between the housing and the cover in the first direction.

8. The developing cartridge according to claim 3, wherein the second end is positioned inside the cover in the second direction, and wherein the first end is positioned outside the cover in the second direction.

9. The developing cartridge according to claim 8, wherein the first end is positioned outside the housing in the second direction.

10. The developing cartridge according to claim 8, wherein the cover includes an opening edge that faces the holder in a rotational direction about the first boss.

11. The developing cartridge according to claim 3, wherein the developing cartridge is mountable to a drum cartridge including a photosensitive drum rotatable about a drum axis extending in the first direction and a drum frame supporting the photosensitive drum, the drum frame includes a protrusion extending in a third direction intersecting the first direction and the second direction, wherein the second end is in contact with the protrusion in a state where the developing cartridge is mounted to the drum cartridge.

12. The developing cartridge according to claim 11, wherein the holder includes a guide surface inclined relative to the second direction and the third direction, the guide surface is configured to contact the protrusion in a process of attaching the developing cartridge to the drum cartridge.

13. The developing cartridge according to claim 12, wherein the guide surface includes a first guide surface and a second guide surface inclined relative to the first guide surface.

14. The developing cartridge according to claim 11, wherein the drum cartridge includes a pressing member configured to press the developing cartridge toward the photosensitive drum in a state where the developing cartridge is mounted to the drum cartridge, wherein the housing includes a pressing surface with which the pressing member comes into contact, and wherein the holder and the pressing surface are arranged in a direction intersecting the first direction.

15. The developing cartridge according to claim 1, wherein the holder includes a second boss extending in the first direction toward the housing, wherein the housing includes a recess recessed in the first direction, and wherein the holder is movable relative to the housing in a direction intersecting the first direction in a state where the second boss is inserted in the recess.

16. The developing cartridge according to claim 1, wherein the holder includes:

a first holder including the first end; and a second holder including the second end, wherein the spring is positioned between the first holder and the second holder.

17. The developing cartridge according to claim 16, wherein the first holder has an opening facing the second holder, and wherein the second holder is received in the opening.

* * * * *